United States Patent [19]

Duncan et al.

[11] 4,083,083

[45] Apr. 11, 1978

[54] MACHINE FOR CUTTING POULTRY INTO SELECTIVELY VARIABLE PORTIONS

[75] Inventors: William D. Duncan; Carolyn L. Duncan, both of Kokomo, Ind.

[73] Assignee: Duncan Creations, Inc., Kokomo, Ind.

[21] Appl. No.: 724,694

[22] Filed: Sep. 17, 1976

Related U.S. Application Data

[63] Continuation of Ser. No. 583,875, Jun. 5, 1975, abandoned.

[51] Int. Cl.² .......................................... A22C 21/00
[52] U.S. Cl. ........................................ 17/11; 17/52
[58] Field of Search ............................ 17/11, 52, 24

[56] References Cited

U.S. PATENT DOCUMENTS

| | | | |
|---|---|---|---|
| 2,766,477 | 10/1956 | Dahlberg | 17/11 |
| 2,807,046 | 9/1957 | Hebenheimer | 17/11 |
| 3,639,945 | 2/1972 | Duncan et al. | 17/11 |
| 3,662,430 | 5/1972 | Lloyd et al. | 17/11 |
| 3,731,344 | 5/1973 | Phares et al. | 17/11 |
| 3,787,926 | 1/1974 | Schacht | 17/11 |
| 3,805,328 | 4/1974 | Strandine et al. | 17/11 |
| 3,890,674 | 6/1975 | Fradin | 17/11 |
| 3,908,230 | 9/1975 | Hartmann | 17/52 X |
| 3,950,820 | 4/1976 | Duncan et al. | 17/11 |

Primary Examiner—Louis G. Mancene
Assistant Examiner—Paul J. Hirsch
Attorney, Agent, or Firm—George H. Mitchell, Jr.

[57] ABSTRACT

A machine originally constructed for the automatic cutting of fowl, such as chickens or the like, into nine portions can be modified by the selective removal and/or addition of elements to produce fowl cut into any number of symmetrical pairs of portions from one to five.

8 Claims, 18 Drawing Figures

MACHINE FOR CUTTING POULTRY INTO SELECTIVELY VARIABLE PORTIONS

This is a continuation of copending application Ser. No. 583,875, filed June 5, 1975, now abandoned, and relates to an improvement over the invention disclosed and claimed in U.S. Pat. No. 3,950,820.

In said prior disclosure, an apparatus is shown and claimed which is capable of accepting a whole carcass of a chicken, or similar fowl, and without any further manual assistance or adjustment, will sever the carcass in nine pieces, depositing the severed pieces into a container, or to the inlet end of a conveyor.

Briefly described, these machines consist of a conveying means which has an inlet into which the whole carcass is introduced. This conveyor means thereafter carries the carcass along a path which brings it into engagement with a series of rotating knives, while guide means position the carcass and its extremities in the proper positions to accomplish the desired results.

In these prior machines, the sequence of operation involves the following steps: (1) severing of the wings from the carcass by a pair of rotating knives on opposite sides of the conveyor means (2) slicing off the breast meat and simultaneously severing the legs from their respective thigh portions by two tangentially arranged rotating knives (3) splitting the remaining carcass into two halves by a rotating knife arranged at right angles to the knives which sever the legs, and (4) separating each of the thigh portions from its respective half of the rib cage by a final pair of rotating knives.

The nine-piece unit, which results from the sequence of operations just described, is the preferred method of cutting up chicken served in at least one of the largest of the franchised "fast food" chain store operations. The cut pieces are breaded and fried in deep fat for service to customers.

Therefore, it is an object of the present invention to provide an automatic machine for dividing up a chicken, or other fowl, into a variety of combinations of portions of the carcass body which may vary the number of pieces produced between two and the even-numbers above that up to a total of ten.

It is a further object of the invention to produce a multiplicity of varieties of portions into which fowl may be cut, by easily performed modifications of the apparatus disclosed and claimed in said copending application Ser. No. 436,361, which disclosure is incorporated herein by reference.

Specific examples of said varieties of portions include the following:

1. a two-piece cut in which the carcass is split in half through the center of the rib cage;
2. a four-piece cut in which the rib cage is split in half, as above, and the thighs and legs are severed from the rib cage but not from each other;
3. a six-piece cut in which the carcass is severed as in the four-piece cut and, in addition, the wings are severed from the body.
4. an eight-piece cut is similar to the standard nine-piece cut, with the exception that the breast meat is left in place on each half of the carcass.
5. a ten-piece cut, similar to the eight-piece cut, but wherein the breast meat is removed as two pieces split down the middle.

Other objects and advantages will be apparent to those skilled in the art after reading the following specification in connection with the annexed drawings, in which FIG. 1 is a rear elevation of the chicken cutting apparatus disclosed and claimed in said application Ser. No. 436,361, now U.S. Pat. No. 3,950,820 with the same numerals being used to denote identical elements in both cases;

Figure 1:
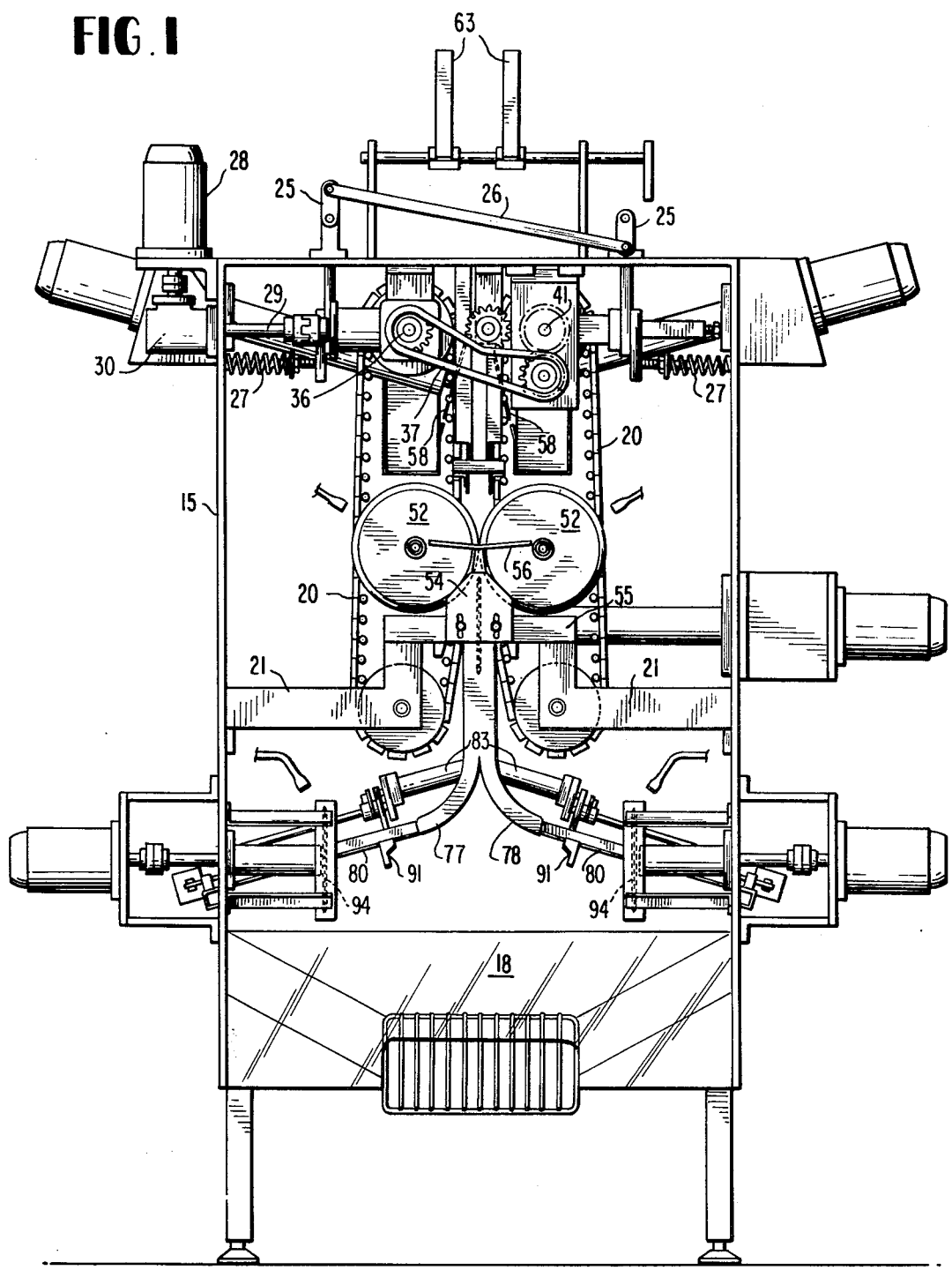

The apparatus shown in FIGS. 1–3, which is used to make the standard nine-piece cut, operates as follows. At the top of the machine there is an arrangement of guides into which the carcass is initially placed by the operator to position the bird so that the breast faces the observer in FIG. 1, with the wings arranged vertically above the leg and thigh portions. The operator then removes his hands and the carcass remains immobile until the operator pushes a starting button energizing a circuit which causes the arms 63 to swing downwardly about their supporting shaft to push the bird into engagement the upper end of a conveying means consisting of the two endless chain mechanisms 20, which are driven through shafts 36 and 41 through chain 37, connected by shaft 29 and transfer gear 30 with motor 28. The lower ends of the endless conveyor are supported on fixed axes by means of supports 21, while the upper ends can move toward and away from each other in opposition to springs 27, this movement being controlled, by the lever system 25 and 26, so that movement of one of the conveyor chains 20 is always equal, and opposite to the movement of the other chain. In this way, the carcass, no matter what its size, is always positioned so that it is centered along a plane midway between the chains as a whole.

Shortly after the carcass begins to be moved downwardly by the conveyor, the two wings are severed from the body by rotating blades 58 (FIG. 2) and dropped into the hopper 18 at the bottom (or into a conveyor belt if one is used to move the pieces to a packing station).

Further downward movement brings the carcass into engagement with the adjustable breast guides 54, 55 and 56 and the two rotating, tangentially arranged knives 52 which removes the breast meat and also sever the legs from the thighs; these three pieces also drop directly into the hopper.

Immediately thereafter, further downward movement brings the remaining carcass into engagement with rotating knife 75 which splits it into two equal halves, as a result of the centering action of the two chains referred to above. Howver, in this case the two halves drop into respective outwardly directed chutes 77 and 78 (FIG. 1) which lead them to respective mechanisms (one of which is shown in FIG. 3) which guide them and push them into proper positions for severance of the thighs from the rib cages by rotating knives 94.

Figure 3:
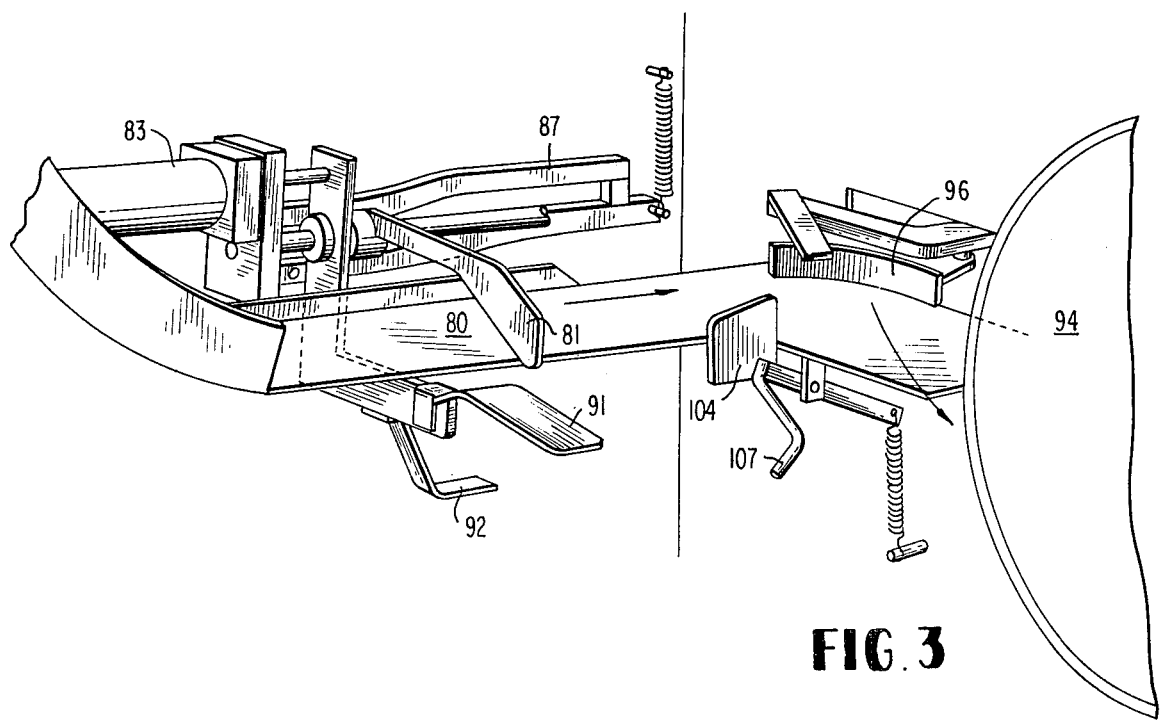
FIG. 3 is a perspective detail of the arrangement for severing the legs from the thighs in FIGS. 1 and 2.

Briefly stated, the mechanism of FIG. 3 permits the rib cage, with attached thigh, to slide by gravity along the inclined surface 80 with the severed side of the rib cage facing down. After it moves past the pusher, engagement with curved guide 96 actuates a switch, causing piston 83 to move pusher 81 and lower guide 91, with the attached finger 92, towards the guide 96 while the cam surface 87 (which has held 81 in its upper position to allow the rib cage to slide beneath) allows pusher 81 to drop down. When the finger 92 hits the arm 107, it rotates guide plate 104 to a lowered position which permits guide 96 to rotate about a vertical axis to push the rib cage into position where the blade 94 engages with the thigh joint. When severed, both pieces drop into the hopper 18.

The foregoing description refers to the intended operation of the apparatus described and claimed in Ser. No. 436,361 wherein all of the elements are used to produce the nine-piece cut.

The scope of the present application relates to the concept of modifying said prior apparatus, by the elimination of certain elements of the original combination and/or the addition or substitution of different elements to provide a flexible machine capable of automatically cutting chicken, or similar fowl, into a variety of combinations of portions consisting of an even-number of pieces between two and ten.

Figure 4:
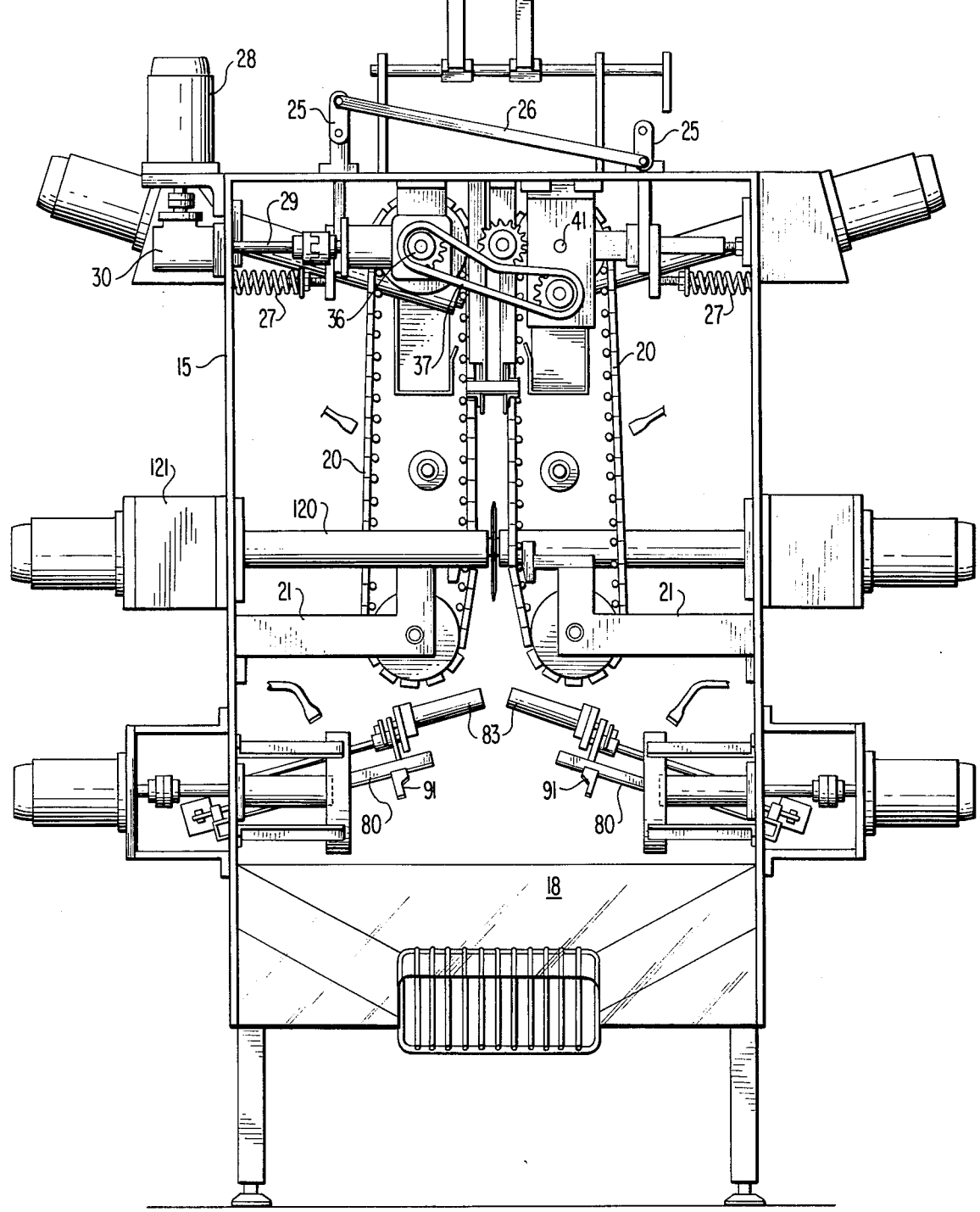
FIGS. 4 and 5 are respective rear and side elevations of the apparatus modified to make the two-piece cut which is sequentially illustrated in FIG. 6.
Figure 6:
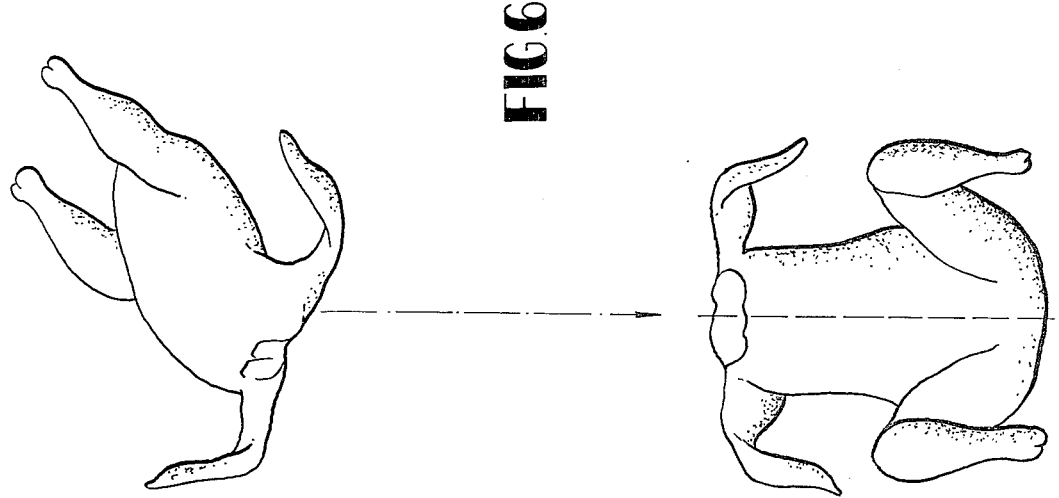
Figure 5:
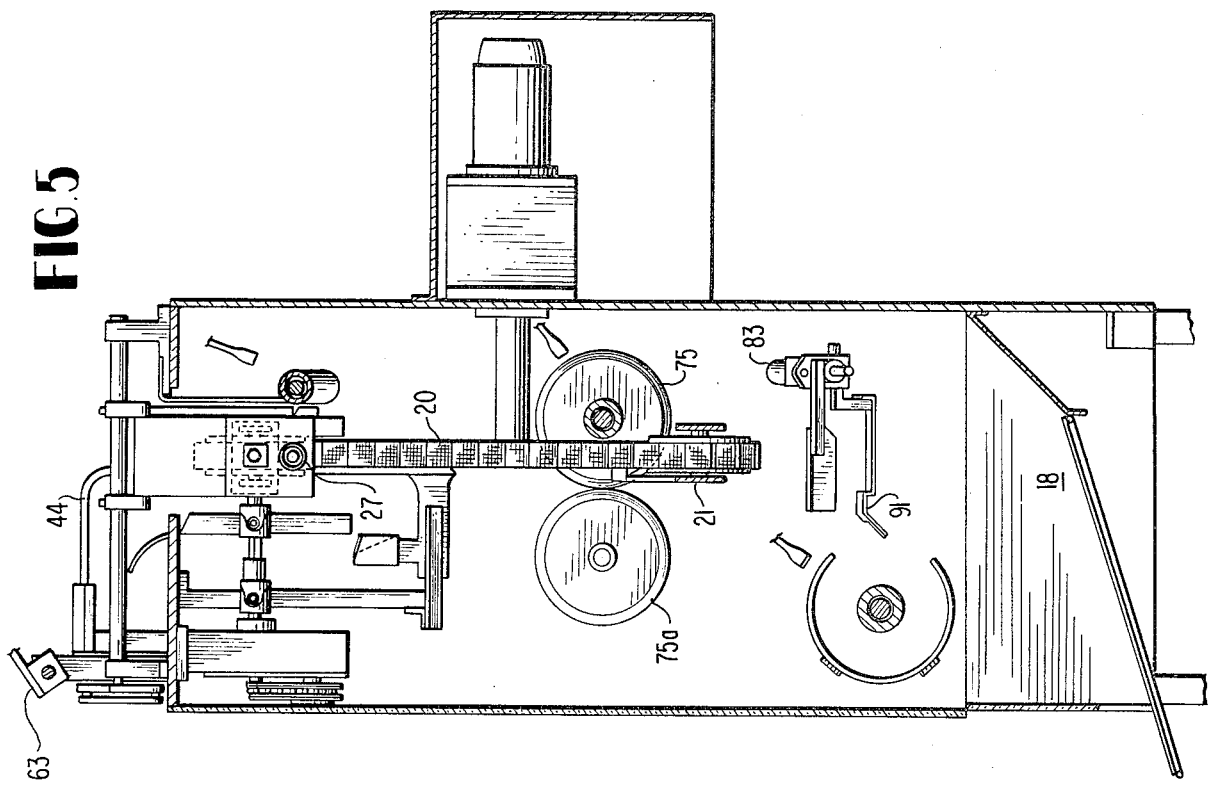

As shown in FIGS. 4 and 5, the machine may be modified to make a two-piece cut by removing the knives 58 (FIG. 2) used to sever the wings; removing the breast adjustment guides 54, 55 and 56 and the knives 52 used to slice off breast meat (FIG. 1), so that the breast portion can move freely through this area.

A knife 75a is added, supported on shaft housing 120 in tangential coplanar relationship to knife 75, and driven by motor 121, and the chutes 77 and 78 are removed. For safety, the blades 94, used for separating thighs from ribs, should be removed.

In operation, the carcass is inserted into the conveyor means in the usual way and when it reaches the knives 75 and 75a it is accurately severed into two equal halves, which drop into hopper 18.

Figure 7:
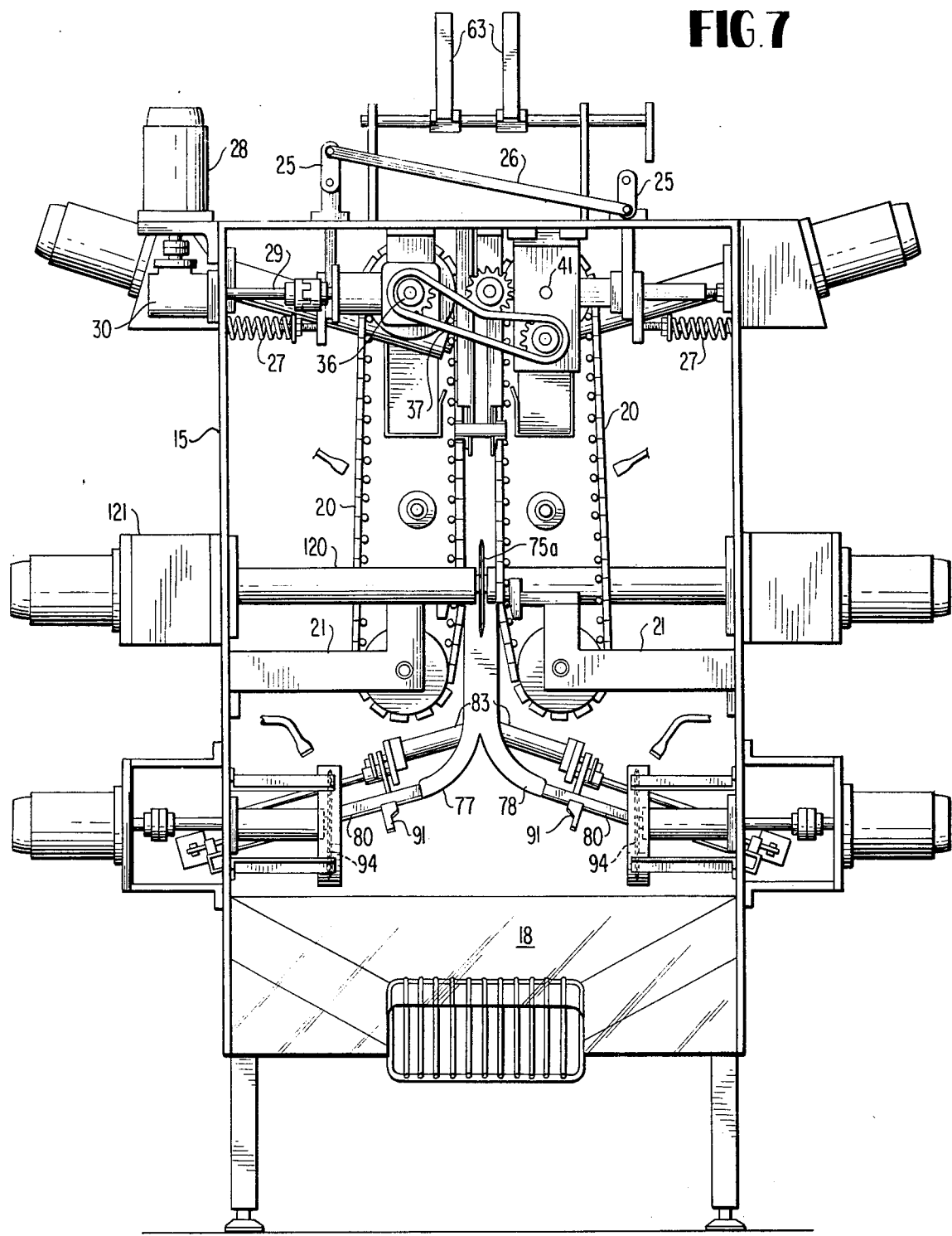
FIGS. 7 and 8 are respective rear and side elevations of the apparatus modified to make the four-piece cut illustrated in FIG. 9.
Figure 9:
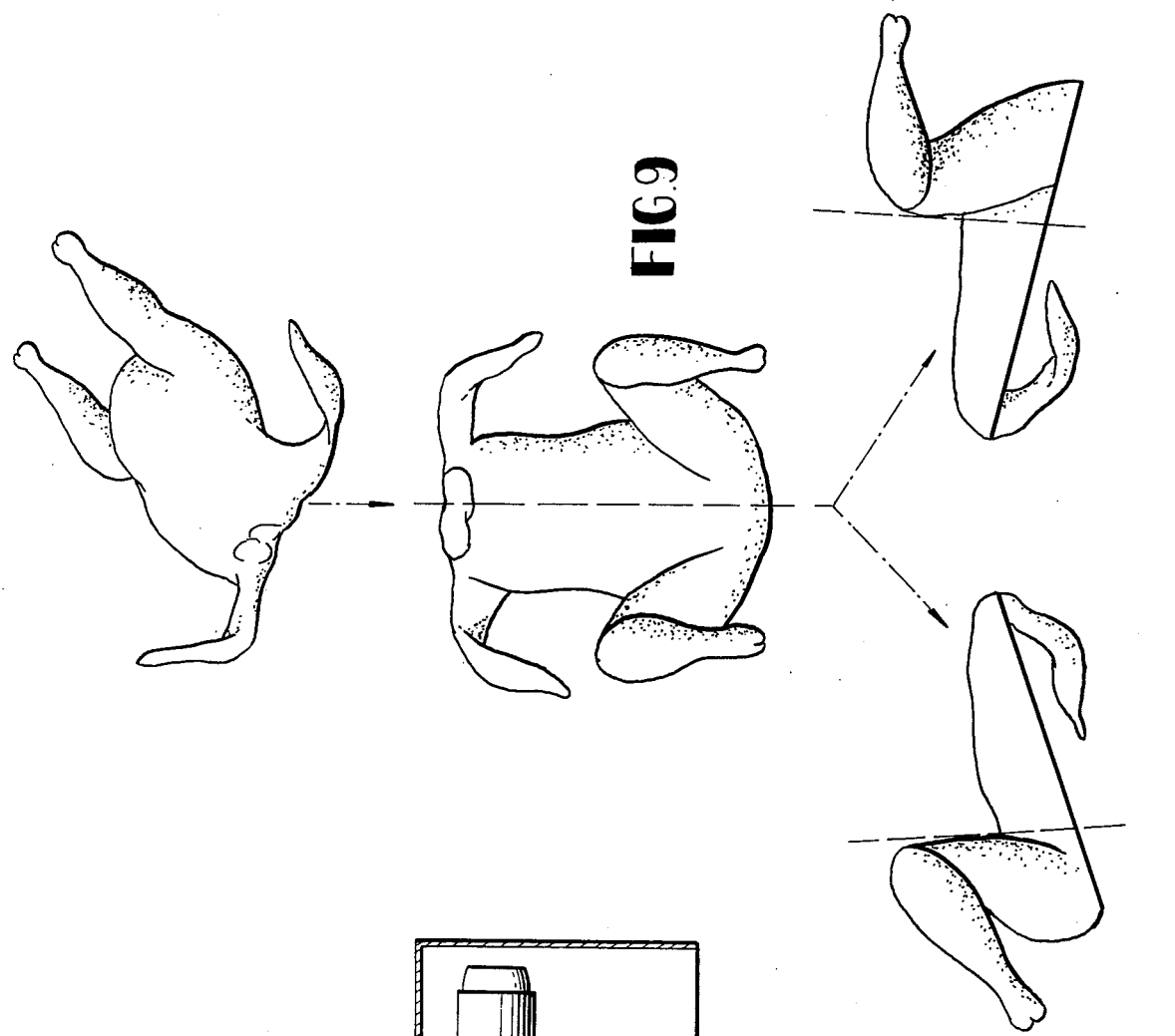
Figure 8:
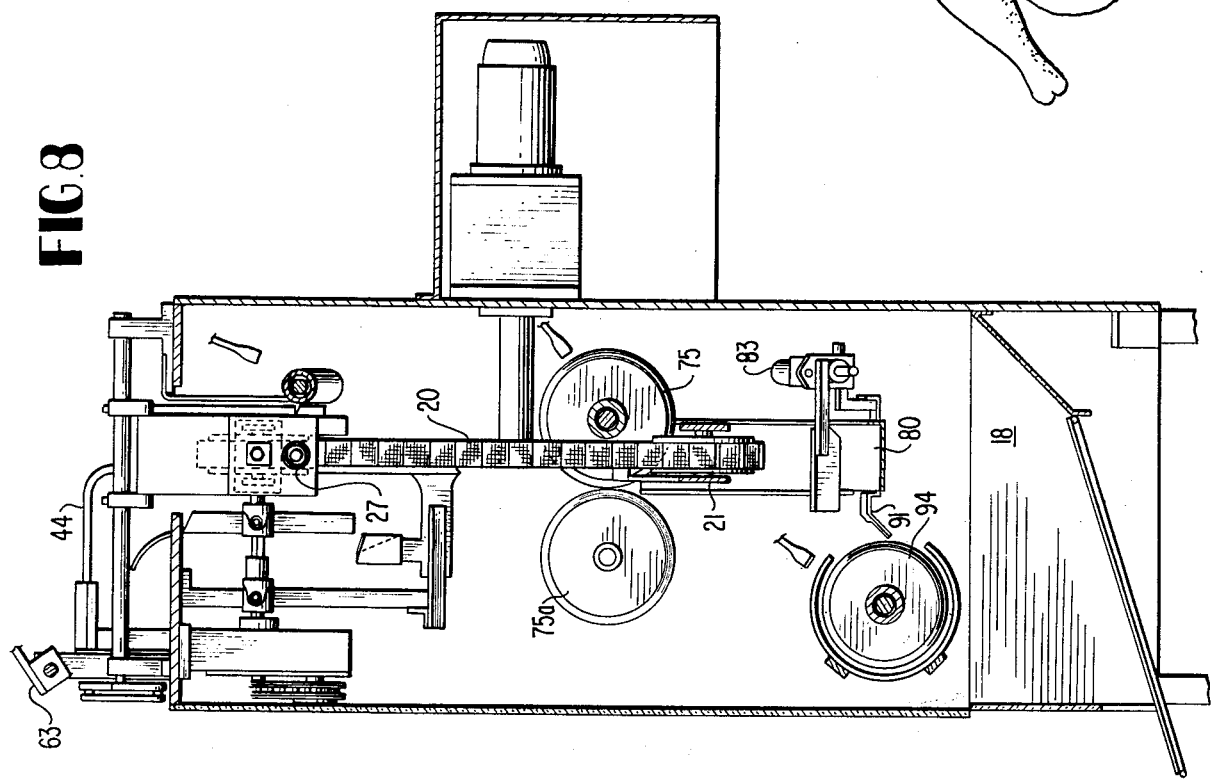

The modification shown in FIGS. 7 and 8 produces the four-piece cut exemplified by FIG. 9. In this case, the machine set-up is similar to that for the two-piece cut, in that the wing knives 58, leg knives 52 and the breast guides 54, 55 and 56 are removed, and the added knife 75a is used.

The four-piece arrangement differs, in that the chutes 77 and 78 are retained as well as knives 94. In operation, the carcass is split in half by the combination of blades 75 and 75a, after which the two halves proceed down the chutes 77 and 78 to respective knives 94, where the thigh and leg portions, combined, are severed from each half and dropped into hopper 18.

Figure 10:
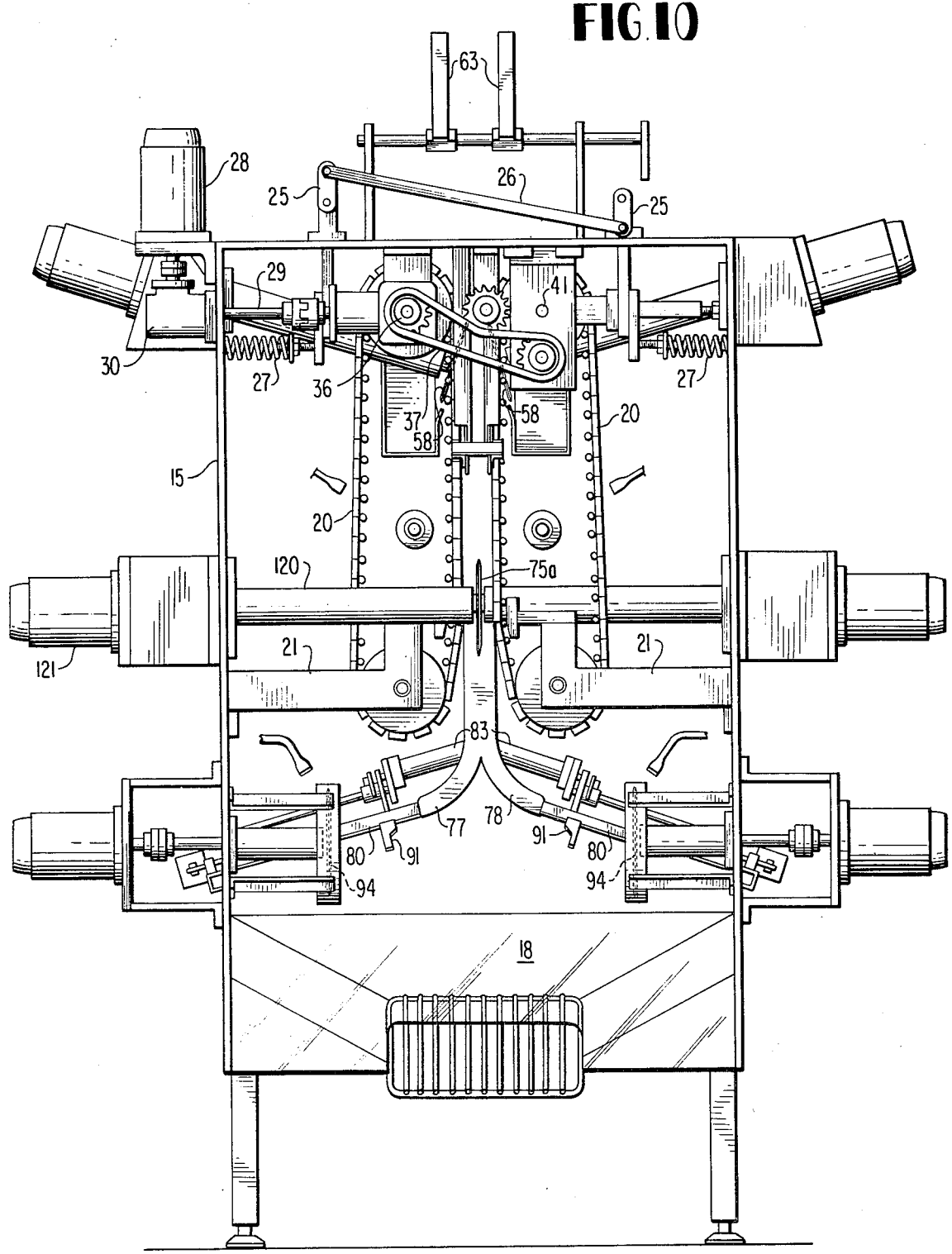
FIGS. 10 and 11 are respective rear and side elevations of the apparatus prepared to make the six-piece cut of FIG. 12.
Figure 12:
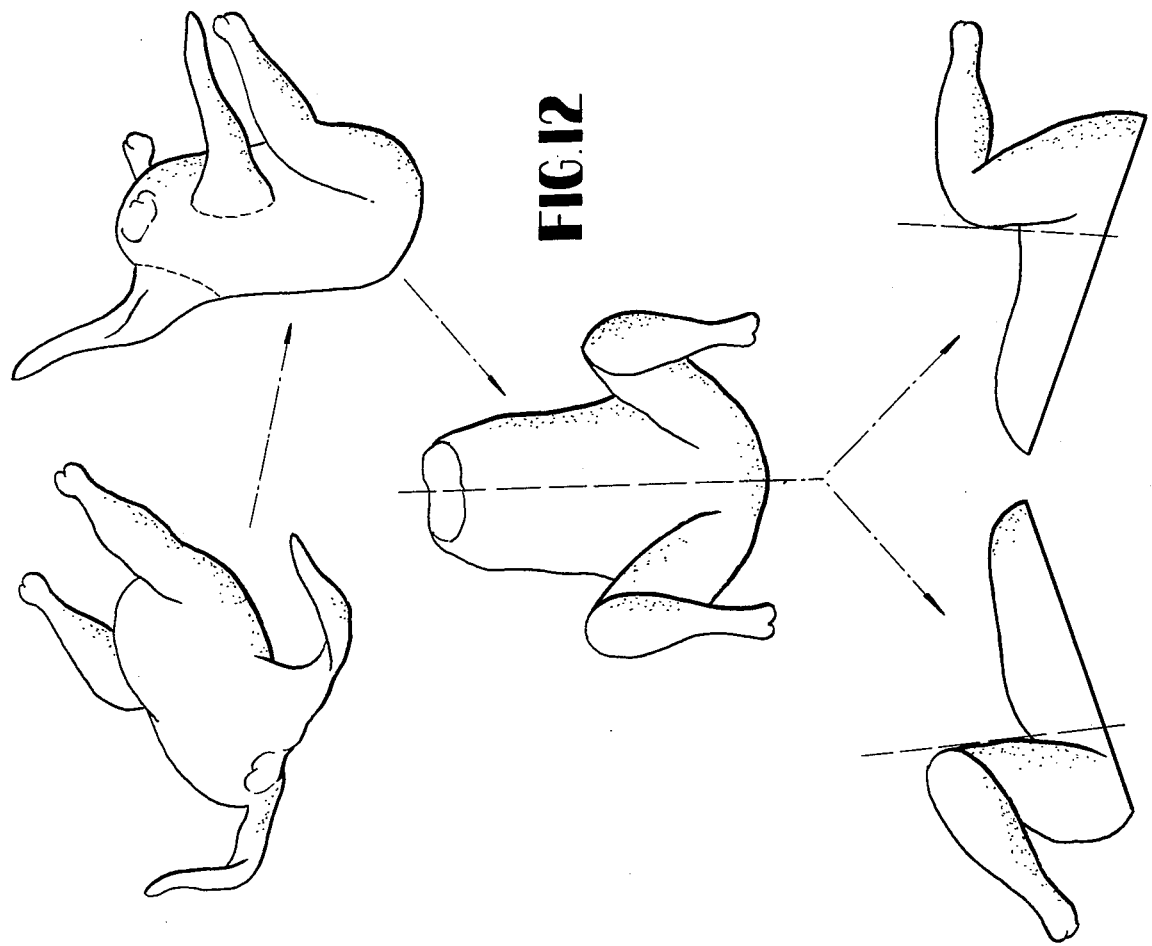
Figure 11:
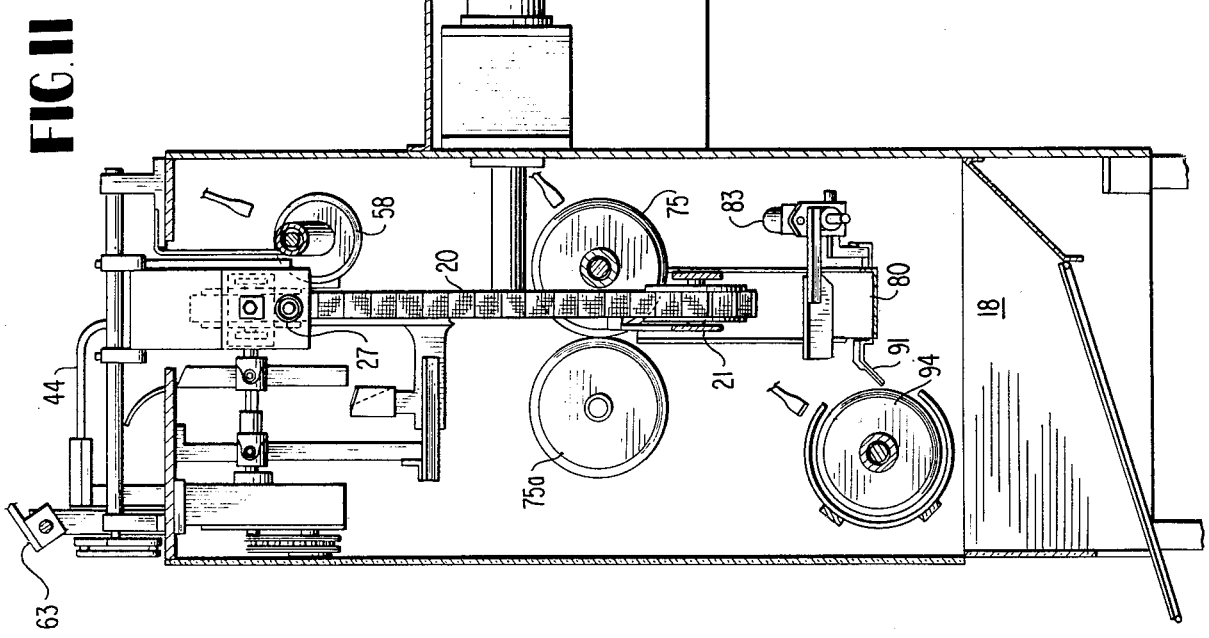

The six-piece arrangement is shown in FIGS. 10 and 11 and the resulting cuts are diagrammatically shown in FIG. 12. The set-up is similar to that for the four-piece cut in that knife 75a used in connection with knife 75 and only knives 52 and breast meat guides 54, 55 and 56 are removed. Knives 58 remain in use.

In operation, the wings are first removed by knives 58, after which the carcass is split in half by knives 75 and 75a. The two halves, with thighs and legs attached proceed down the chutes 77 and 78 to the knives 94, where the combined thighs and legs are severed from each rib cage.

In the case of the eight-piece cut, the machine includes all of the elements of the basic apparatus for making nine-piece cuts as shown in said prior application, and the knife 75a (used in the previous modifications) is left out entirely. In particular, the breast guide 54, held by supports is used to back up the knife 75, as can be seen in FIGS. 13 and 14.

Figure 2:
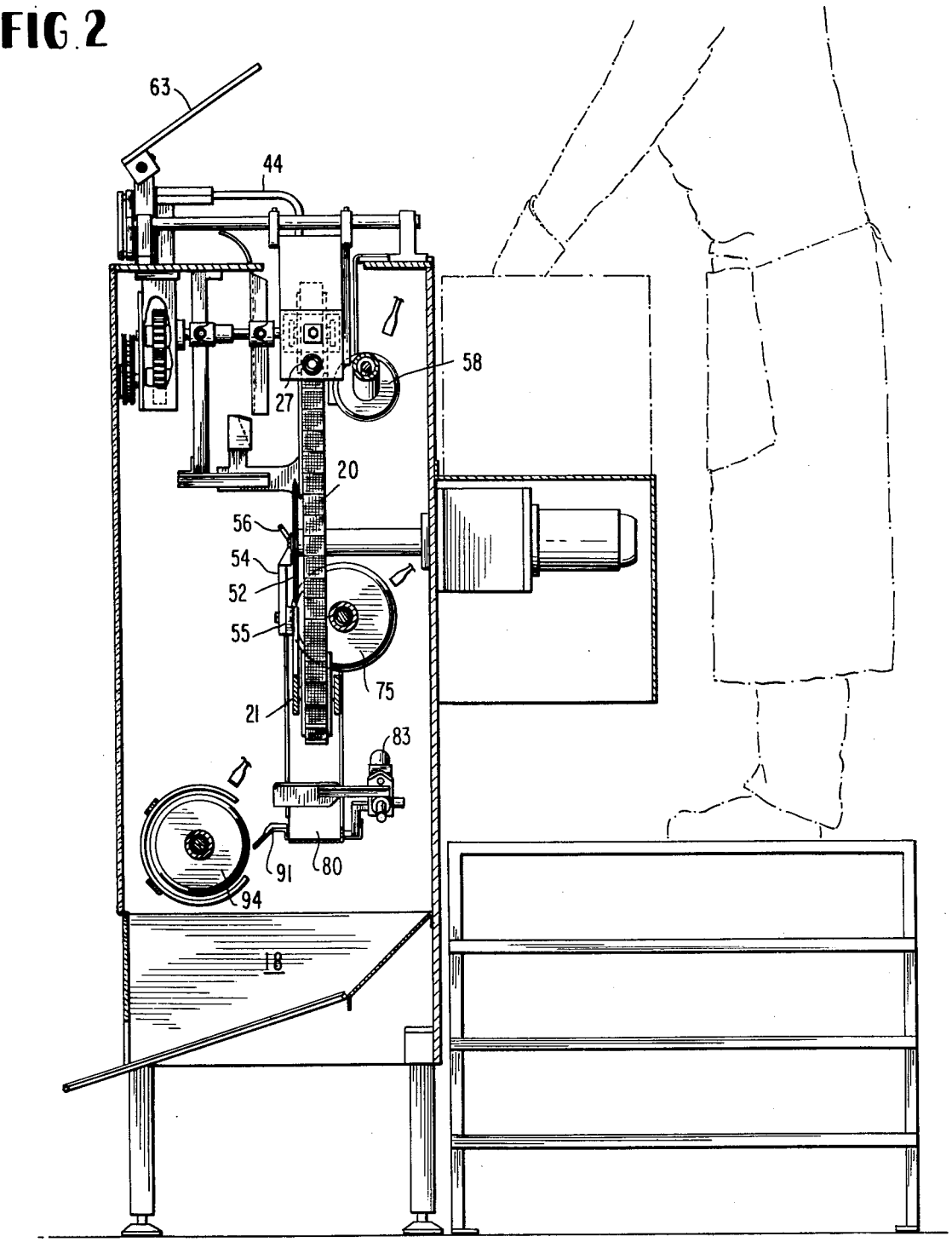
FIG. 2 is a side elevation of the apparatus of FIG. 1.

As can be seen from FIGS. 1 and 2, there are a pair of parallel, horizontally spaced conveyor chains 20 which straddle the breast portion of the carcass so that the breast meat normally projects into the path of knives 52.

Figure 13:
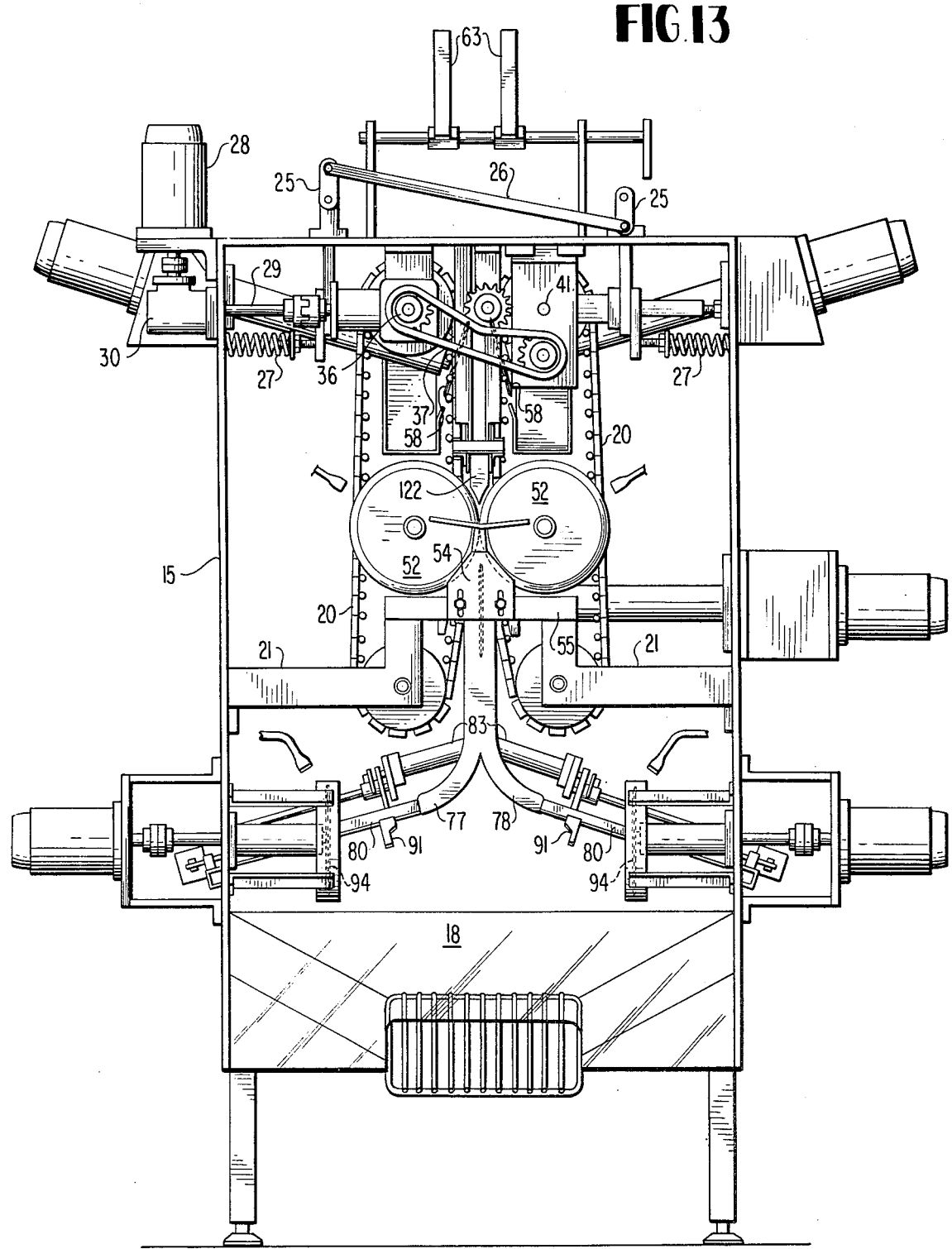
FIGS. 13 and 14 are respective rear and side elevations of the apparatus arranged to make the eight-piece cut of FIG. 15.
Figure 14:
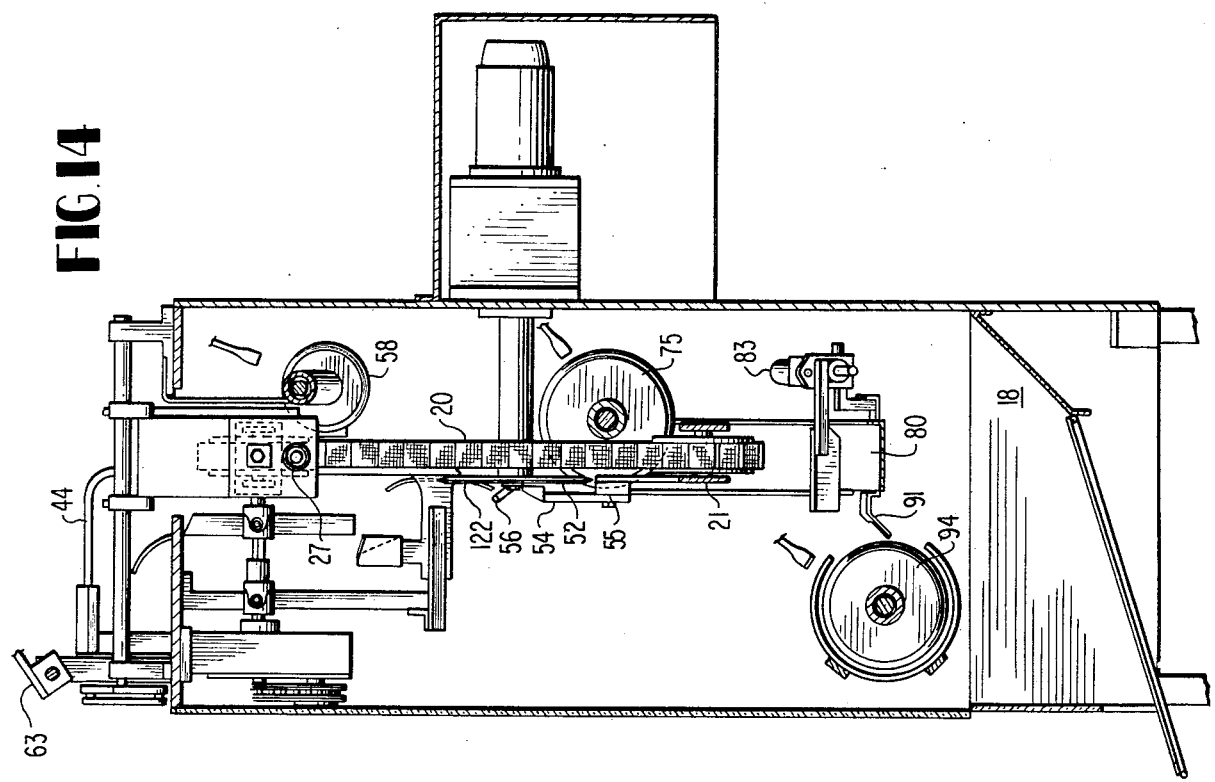

However, for the eight-piece cut, as can be seen in FIGS. 13 and 14, a flat shield 122 can be attached to these rods in a position such that, while the legs will be severed from the thighs by knives 52, the breast meat will be pushed back out of the path of these knives when the carcass passes them.

Figure 15:
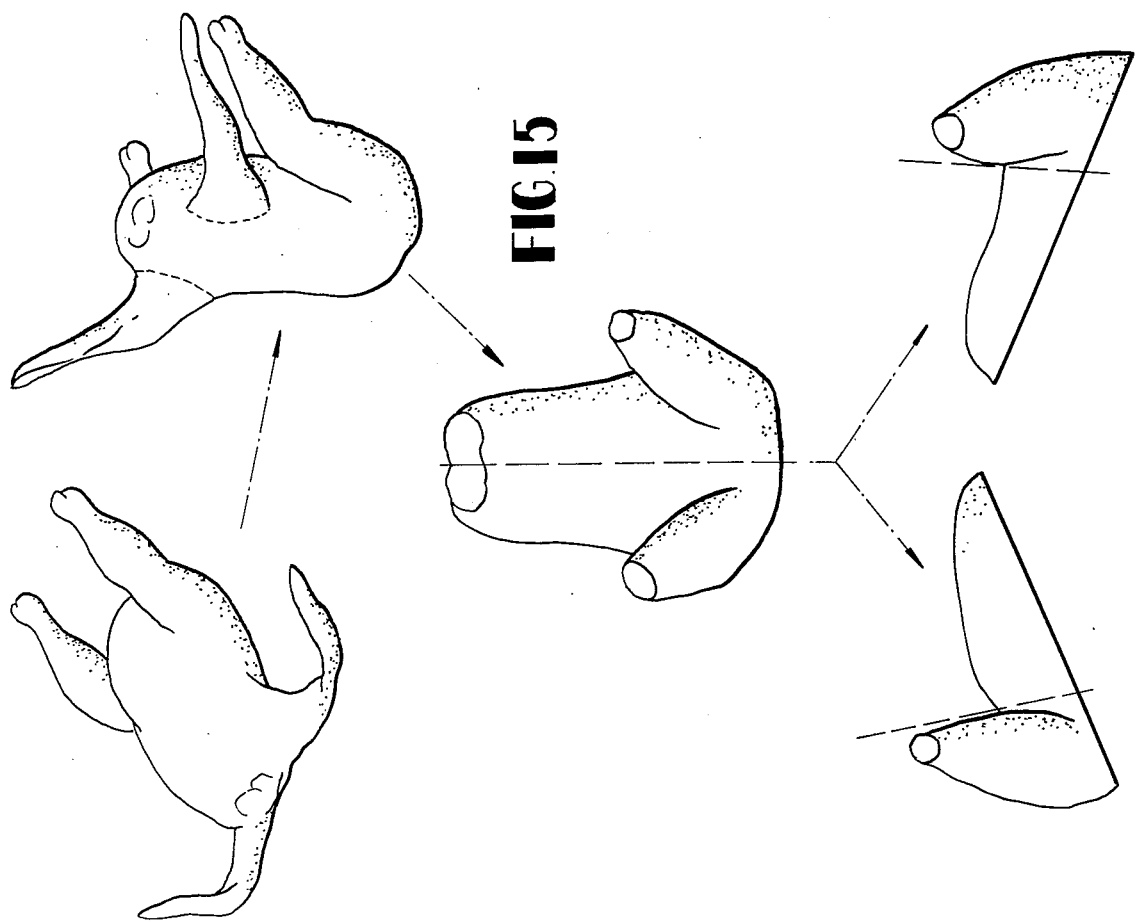
FIGS. 15 and 17 show the apparatus modified to make the ten-piece cut illustrated in FIG. 18.

As a result (the wings having been removed by knives 58) the two halves which pass down through chutes 77 and 78 will have retained their respective portions of the breast meat, as in the case of the previous modifications. Thereafter, the thighs are severed from the rib cages by knives 94, and the resultant product is illustrated in FIG. 15.

Figure 16:
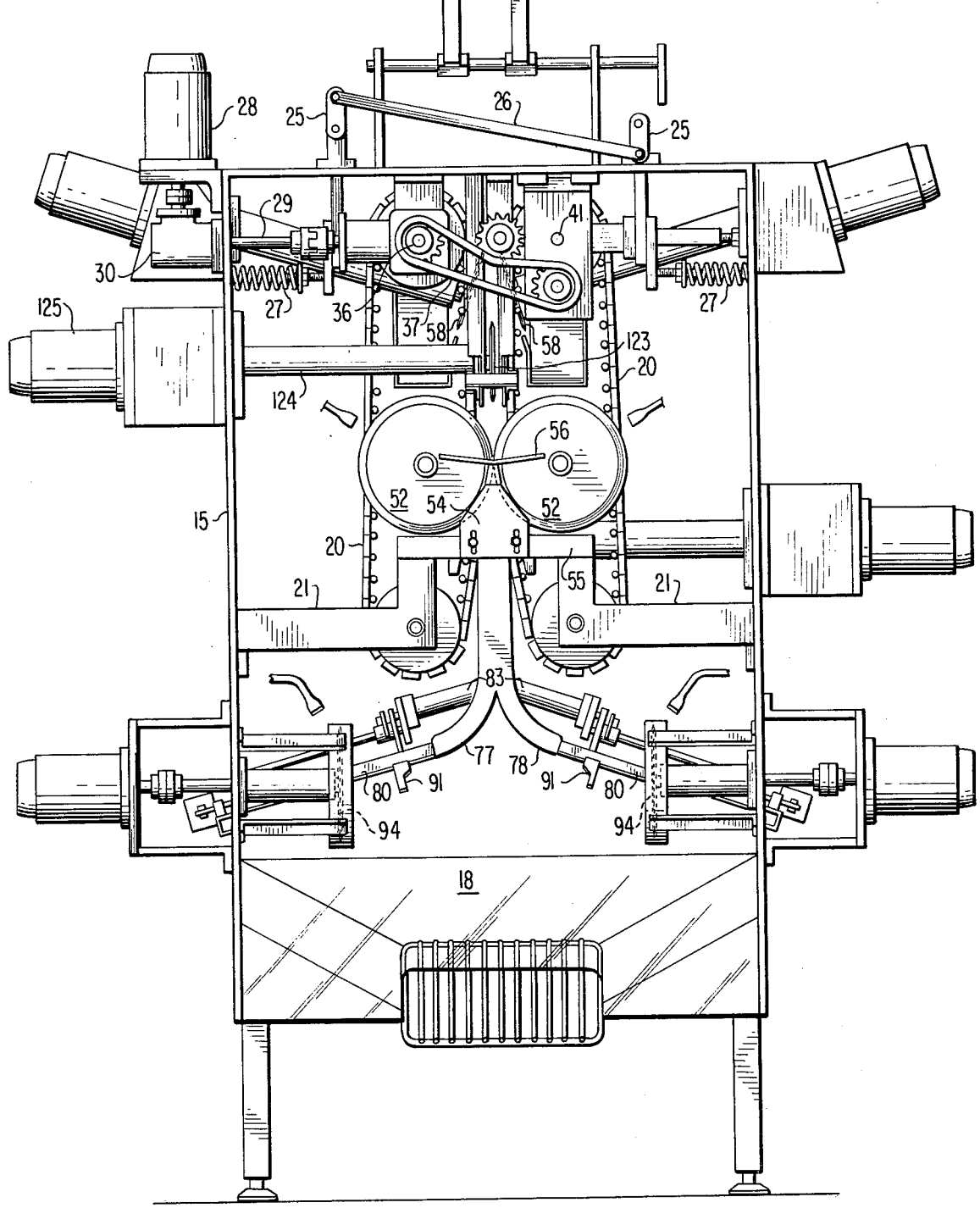
Figure 17:
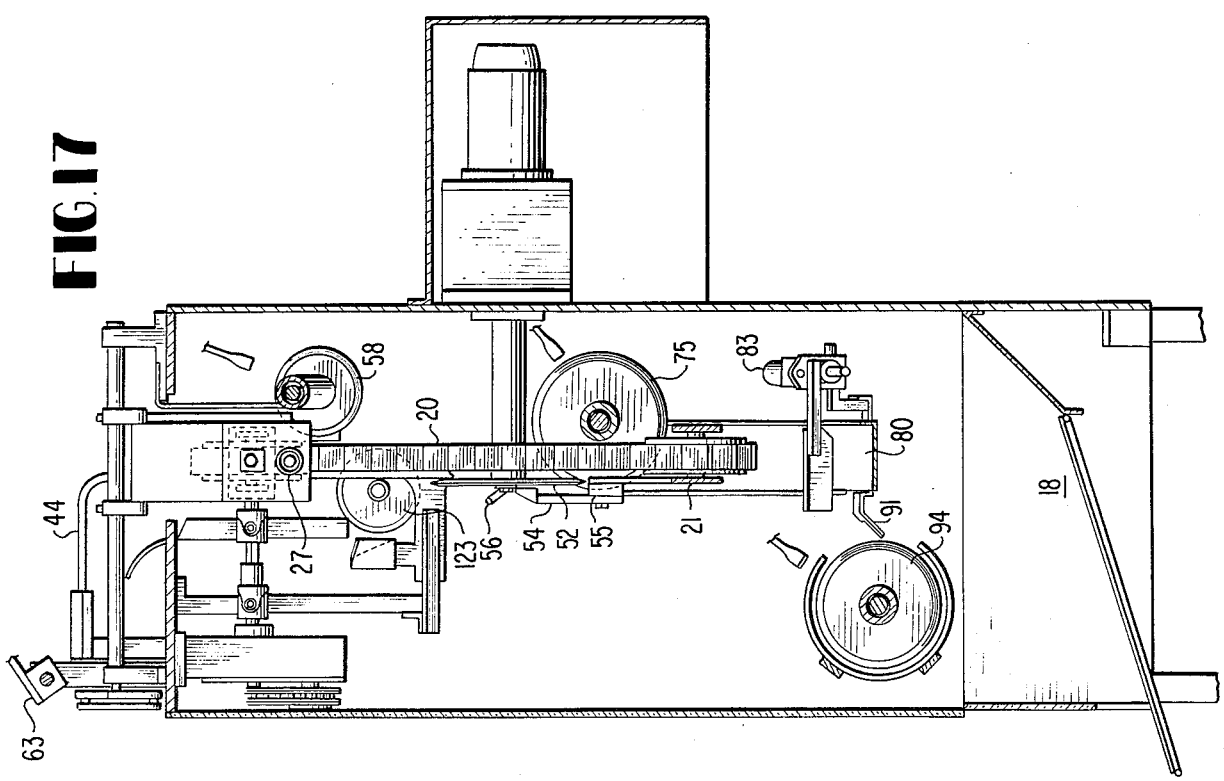

In the final modification for making a ten-piece cut, as shown in FIGS. 16 and 17, the basic apparatus of the prior disclosure of U.S. Pat. No. 3,950,820 is used and an additional knife 123, supported by shaft housing 124 and rotated by motor 125 is positioned in planar alignment with, but somewhat above knife 75. As a practical matter, the knife 75a, with its support 120 and motor 121, used in several of the above modifications, can be repositioned on the wall 15 to accomplish the purposes of knife 123.

Figure 18:
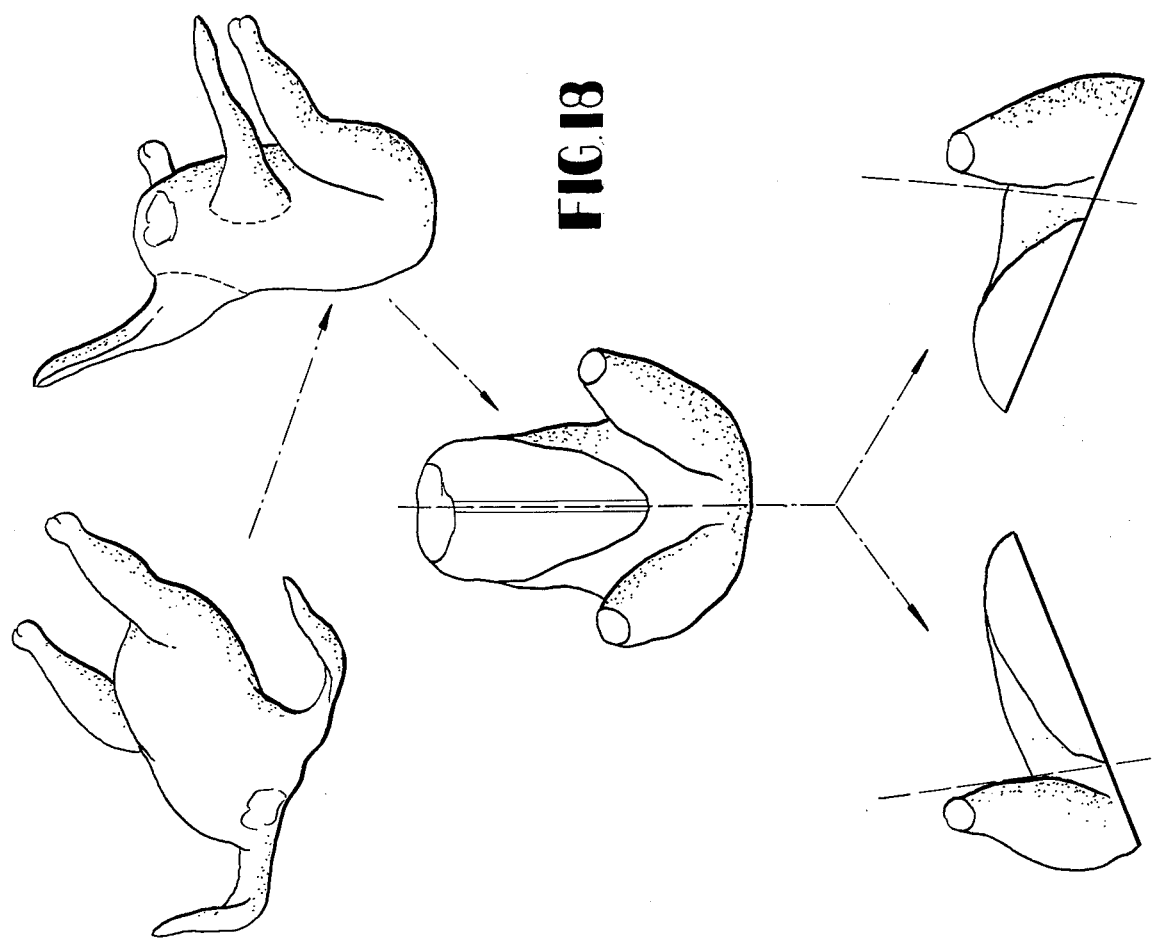

In operation, the wings are removed by knives 58 and immediately thereafter, knife 123 makes a deep cut into the center of the breast meat, which will remain in place until severed from the carcass by knives 52, whereupon the breast meat will drop, in two equal portions, into the hopper 18. The two halves of the rib cage will proceed, as before, to the knives 94 where the thighs are severed. The sequence is illustrated in FIG. 18.

We claim:

1. In apparatus for automatically cutting eviscerated poultry carcasses alternatively into a plurality of preselected groups of portions under the control of a single operator, each of said groups of portions consisting of a whole poultry carcass severed into separate predetermined pieces numbering between two and ten inclusive, comprising:

a frame means;

b first cutter means removably mounted on the frame means for severing the wings from a carcass;

c second cutter means removably mounted on the frame means for severing breast meat from the carcass and the legs from the thighs;

d third cutter means mounted on the frame means for at least partially severing a carcass into two halves in the plane of the backbone;

e fourth cutter means removably mounted on the frame means for severing thighs from the rib cage;

f fifth cutter means including means for removably and selectively mounting the fifth cutter means on the frame means in one position tangent to the third cutter means to coact with said third cutter means to split a carcass into two similar halves and in another position on the frame means to sever the breast meat only into two halves, and;

g conveyor means mounted on the frame means for moving successive poultry carcasses in a predetermined path for engagement with those of said aforementioned cutter means as are mounted on the frame means, whereby the apparatus is convertible to cut poultry carcasses into between two and ten pieces.

2. Apparatus of claim 1 wherein said first cutter means comprises two removably mounted rotary knives disposed in spaced relation to each other.

3. Apparatus of claim 1 wherein said second cutter means comprises a pair of rotary knives removably mounted tangent to each other.

4. Apparatus of claim 1 wherein said third cutter means is a rotary knife fixedly mounted on the frame means.

5. Apparatus of claim 1 wherein said fourth cutter means comprises a pair of rotary knives removably mounted on the frame means.

6. Apparatus of claim 1 wherein said apparatus includes additional shield means for removable mounting on the frame means to prevent removal of breast meat by said second cutter means.

7. In apparatus for automatically cutting chicken, or the like, into a pre-selected number of pieces of the type wherein a self-centering conveyor means comprising a pair of endless belts grasp the opposite sides of the rib cage of a carcass to bring the carcass into engagement with a first rotary knife for severing the carcass into two halves disposed on opposite sides of the plane of the backbone, said first knife being backed up by a fixed guide to enable complete severing of the carcass by said one knife, and said apparatus also includes two additional rotary knives disposed at an angle with respect to the first knife for severing the legs from the thighs and also normally severing the breast meat from the carcass, the improvement which comprises an additional fixed shield arranged adjacent said additional rotary knives in the path of the breast meat as the carcass is moved by the conveyor means toward said additional knives to prevent said breast meat from being severed from the carcass by said additional knives.

8. The invention defined in claim 7, wherein said fixed shield is positioned generally in alignment with said fixed guide whereby the breast meats is cut into two pieces by said first knife.

* * * * *